US011767756B2

(12) United States Patent
Obaid et al.

(10) Patent No.: US 11,767,756 B2
(45) Date of Patent: Sep. 26, 2023

(54) METHOD AND SYSTEM FOR THE DETERMINATION OF HYDROCARBON ACCUMULATIONS

(71) Applicant: Abu Dhabi National Oil Company, Abu Dhabi (AE)

(72) Inventors: Khalid Obaid, Abu Dhabi (AE); Abdulla Shehab, Abu Dhabi (AE); Abdelwahab Noufal, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 0 days.

(21) Appl. No.: 17/645,339

(22) Filed: Dec. 21, 2021

(65) Prior Publication Data

US 2022/0195870 A1  Jun. 23, 2022

(30) Foreign Application Priority Data

Dec. 21, 2020 (EP) .................................... 20216241

(51) Int. Cl.
*E21B 49/08* (2006.01)
*G01V 99/00* (2009.01)
*G06F 11/14* (2006.01)

(52) U.S. Cl.
CPC .......... *E21B 49/087* (2013.01); *G01V 99/00* (2013.01); *G06F 11/1469* (2013.01); *G06F 2201/805* (2013.01)

(58) Field of Classification Search
None
See application file for complete search history.

(56) References Cited

U.S. PATENT DOCUMENTS 4,357,660 A * 11/1982 Hepp .................... E21B 47/026
702/10
6,977,866 B2  12/2005 Huffman et al.
(Continued)

FOREIGN PATENT DOCUMENTS

CN  206610548 U  * 11/2017

OTHER PUBLICATIONS

CN206610548U, translation (Year: 2017).*
(Continued)

*Primary Examiner* — Lina Cordero
(74) *Attorney, Agent, or Firm* — Renner, Otto, Boisselle & Sklar, LLP

(57) ABSTRACT

A method and system for determination of hydrocarbon accumulations in a subsurface geological area are disclosed. The method comprises creating a structural framework of the subsurface geological area, calculation of a mechanical stress, identifying trapping mechanisms, predicting of a relative fold movement, and estimating of the formation of the hydrocarbon accumulations, and determining the location of the hydrocarbon accumulations in the subsurface geological area. The system used for the determination of the hydrocarbon accumulations comprises an input device for inputting a plurality of data, a properties module for creating a structural framework using the inputted plurality of the data, a processor for the calculation of compressional and tensional forces, fault patterns, and a relative fold movement, an estimation module for estimating the formation of hydrocarbon accumulations, a locator module for determining the presence of hydrocarbon accumulations, and a memory comprising at least one of the structural framework and a data.

10 Claims, 9 Drawing Sheets

(56) References Cited

U.S. PATENT DOCUMENTS

| | | | |
|---|---|---|---|
| 7,054,753 | B1 | 5/2006 | Williams et al. |
| 8,494,827 | B2 | 7/2013 | Mutlu et al. |
| 9,194,968 | B2 | 11/2015 | Imhof et al. |
| 2009/0265152 | A1* | 10/2009 | Cacas ............... G01V 99/00 702/6 |
| 2010/0257004 | A1 | 10/2010 | Perlmutter et al. |
| 2011/0264430 | A1 | 10/2011 | Tapscott et al. |
| 2017/0177764 | A1 | 6/2017 | Guy et al. |
| 2017/0205531 | A1* | 7/2017 | Berard ............... G01V 11/00 |
| 2017/0315266 | A1* | 11/2017 | Myers ............... G01V 99/005 |
| 2018/0172857 | A1 | 6/2018 | Lejri et al. |
| 2020/0393586 | A1 | 12/2020 | Babcock |

OTHER PUBLICATIONS

Noweir, M. Atef.: "Back-thrust Origin of the Hafit Structure, Northern Oman Mountain Front, United Arab Emirates", GeoArabia, vol. 5, 2000, pp. 215-228.

Noweir, M. Atef et al.: "Structural Style and Stratigraphy of the Huwayyah Anticline: An Example of an Al-Ain Tertiary Fold,Northern Oman Mountains", GeoArabia, vol. 5, 2000, pp. 387-402.

Noufal, Abdelwahab et al.: "Tectonic Map of Abu Dhabi, UAE." and "Abu Dhabi Stress Map, UAE.", Papers presented at the Abu Dhabi International Petroleum Exhibition and Conference, Abu Dhabi, UAE, Nov. 7, 2016 (Nov. 7, 2016).

Konert, Geert et al.: "Paleozoic Stratigraphy and Hydrocarbon Habitat of the Arabian Plate", GeoArabia, vol. 6, 2001, pp. 407-442.

Johnson, C. L. et al.: "Sedimentary response to arc-continent collision, Permian, southern Mongolia", Geological Society of America Special Papers, vol. 436, 2008, pp. 363-390.

Obaid, Khalid et al.: "Enhanced Interpretation Of Salt-Related Structures In Abu Dhabi Using Improved Seismic Data Processing And Interpretation Techniques", EPO Form 1703 01 .91 TRI Paper presented at the Abu Dhabi International Petroleum Exhibition and Conference, Abu Dhabi, UAE, Nov. 10, 2014 (Nov. 10. 2014).

Noufal, Abdelwahabshebl, Hesham: "Halokinesis Stimuluses on Petroleum System of Abu Dhabi", Paper presented at the Abu Dhabi International Petroleum Exhibition and Conference, Abu Dhabi, UAE, Nov. 11, 2019 (Nov. 11, 2019).

Arfan, Ali et al.: "Maximizing Hydrocarbon Recovery and Water Injection Support through Pattern Reviews Between Injector Producer Pairs in a Large, Complex, and Faulted Brown Field in SE Asia", Paper presented at the Abu Dhabi International Petroleum Exhibition and Conference, Abu Dhabi, UAE, Nov. 9, 2020 (Nov. 9, 2020).

Al-Barwani Bmcclay KR: "Salt tectonics in the Thumrait area, in the southern part of the South Oman Basin: implications for mine-basin evolution", GeoArabia, vol. 13, 2008, pp. 77-108.

Al-Siyabi, Hisham A.: "Exploration history of the Ara intrasalt carbonate stringers in the South Oman Salt Basin", GeoArabia, vol. 10, No. 4, 2005, pp. 39-72.

Loosveld, Ramont et al.: "The Tectonic Evolution of Interior Oman", GeoArabia, vol. 1, No. 1, 1996, pp. 28-51.

Droste, Henk: "Sequence-stratigraphic framework of the Aptian Shu'aiba Formation in the Sultanate of Oman", GeoArabia Special Publication, vol. 4, No. 1, 2010, pp. 229-283.

Faqira, Mohammad et al.: "New insights into the Hercynian Orogeny, and their implications for the Paleozoic Hydrocarbon System in the Arabian Plate", Geoarabia, vol. 14, 2009, pp. 199-228.

Boote, David.R.D. et al.: "Paleozoic petroleum systems of North Africa", 1998, Geological Society, London, Special Publications, vol. 132, pp. 7-68.

Extended European Search Report for corresponding European Patent Application No. 20216241.8 dated Jun. 8, 2021.

* cited by examiner

METHOD AND SYSTEM FOR THE DETERMINATION OF HYDROCARBON ACCUMULATIONS

This application claims priority of European Patent Application No. 20216241.8, filed Dec. 21, 2020, the entire disclosure of which is hereby incorporated by reference.

FIELD OF THE INVENTION

The present invention relates to a computer-implemented method and system for determination of hydrocarbon accumulations in a subsurface geological area using structural simulation of the formation of oil or gas bearing underground structures.

BACKGROUND OF THE INVENTION

The subsurface hydrocarbon accumulations found in Abu Dhabi, UAE, possess different types of geometries and structural patterns. These structural patterns can be subdivided into two main categories, tectonic related structural patterns, and salt related structural patterns. The tectonic related structural patterns in Abu Dhabi are mainly folding related faults. The folding related faults are usually caused by a relative movement of the subsurface geological area, causing the displacement of large volumes of rock. The displacement of the volumes of rock cause causes fractures or so-called faults between layers or areas of the subsurface structures. In Abu Dhabi, most of the folding related structural patterns found are formed as shown in FIG. 1 by double-plunging anticlines. These double-plunging anticlines are a result of different wrench and shear forces present in the fault zones.

In salt related structural patterns, however, four-way domal anticlines are predominantly found in Abu Dhabi. Significant parts of the structural patterns found in Abu Dhabi have been formed during the Cretaceous period. The volumes of rock formed during the Cretaceous period are referred to as a Cretaceous System. A close relationship of the kinematics and the timing between high-angle strike-slip faulting and upright folding can be established for the Cretaceous Systems found in Abu Dhabi. The folding of the Cretaceous Systems is accompanied by tectonic denudation, sometimes also described as weathering or erosion, developing elongated plunging anticlines. These elongated plunging anticlines show fold axes both parallel and perpendicular to the direction of the strike-slip faults.

Understanding the structural patterns of the hydrocarbon accumulations and their kinematic evolution leads to an understanding of the evolution of the hydrocarbon accumulations. The trapping mechanisms effectively leading to the formation or separation of the subsurface hydrocarbon accumulations can be determined using the knowledge on the formation of the Cretaceous Systems.

Outcrop studies have been conducted on the structural geometries of the Oman fold-belt and Abu Dhabi. These outcrop studies of exposed folds along the front of the Oman fold-belt have found asymmetric anticlines with steeper limbs on both the eastern and western flanks of the folds [1, 2]. In the studies conducted, the folds were interpreted as having been detached from one another in the near Berriasian to Aptian period and are therefore described as fault-propagation folds. Special cases of these folds can also sometimes be found in the subsurface geological area. One example for these special folding structures might be Hafit structure in which the steep limb is pointing toward to the east. The Hafit structure can therefore be seen as a thrust in which displacement is in an opposite direction of the main propagation direction, also called a backthrust.

The models described in [1, 2], however, fail to explain why the dip magnitudes of the forelimbs and backlimbs of the Hafit structure do not match those predicted by fault-propagation modeling. In [1, 2], the models suggest a mechanism of progressive limb rotation during formation of the folds of the Hafit structure during the Berriasian to Aptian period. Furthermore, exposed folds are described as including segments as young as Oligocene. However, no growth was observed in the folded strata. Thus, a fold-belt deformation as young as mid-Tertiary is indicated. The current simulation models available for the prediction of subsurface hydrocarbon accumulations do not, however, offer comprehensive methods for the interpretation of said observations.

There are a number of patents and pending applications which describe models and systems for determination of hydrocarbon accumulations in a subsurface geological area using structural simulation of the formation of oil or gas bearing underground structures. For example, U.S. Pat. No. 7,054,753 B1 (Robinson et al.; assigned to Drilling Info, Inc) relates to a method of locating oil and gas exploration prospects. A digital model of each of the many geologic strata that compose a basin is created for all or a portion of a basin by digit-izing well log data, collecting all digitized well log data in a data base, marking common geological time markers throughout the entire basin and visually displaying the basin in a number of different views to permit the isolation or identification of oil and gas producing geological formations. The method of this patent comprises the correlation of a normalized, digitized well log data to an identified geographic basin map to create a stratigraphic framework for an entire basin. This correlation enables an estimate for the prospects for oil and gas drilling in the selected regions. The patent describes a method for estimating oil/gas exploration prospects using different data sources and combining them in one model. The data is processed, normalized, and fed into a decision-making tool that evaluates the prospects for the exploration of oil/gas in a given geographical region. The patent discloses different steps for processing data in the field of oil/gas exploration using computer systems. It does not, however, discuss a simulation model for the geological structures and their formation.

U.S. Pat. No. 9,194,968 B2 (Dimitrov et al.; assigned to ExxonMobil) relates to a computer-implemented seismic data volume analyzing method for a geophysical prospecting field. The method involves ranking segments for detecting the presence of a hydrocarbon system based on prospectivity [or probability] scores for small volume increments ("voxels") of seismic data in segments. The method enables computing multi-scale and structure-oriented seismic attributes that relate to the classical elements of a hydrocarbon system. A score is calculated for each selected element based on at least one seismic attribute, and the prospectivity score is formed by combining the element scores. The attributes are spatially correlated and compared against a catalog of hydrocarbon trap configurations to determine the potential presence of hydrocarbon traps and estimate confidence of the existence of the hydrocarbon trap. The method disclosed in the patent relates to the analyzing of subterranean hydrocarbon structures using computer simulation. The focus of the patent lies in a method for subdividing a given data set in order to calculate a prospect of finding oil/gas in a given region. The patent does not explicitly discuss the role of folds in the formation and separation of underground reservoirs. A simulation method for the calculation is also not revealed.

U.S. Pat. No. 8,494,827 B2 (Mutlu et al.; assigned to ExxonMobil) teaches a fracture predicting method for a subsurface region in a well. The method involves determining whether a predicted occurrence of a fracture correlates with an expected natural response and outputting the natural fracture characteristics and damage from model. A Finite-discrete (hybrid FEM-DEM) element solver and a nodal failure mechanism are integrated for the model to discover natural fracture patterns and localized damage. A determination is made whether the occurrence correlates with an expected natural response. The patent's focus is on the formation of underground fractures. An exact modelling of the subsurface deformation of an entire area is not discussed further.

US Patent Application No. US 2010/257004 A1 (Perlmutter et al.; assigned to Chevron) teaches a computer implemented method and system for conducting a geologic basin analysis to determine the accumulation of hydrocarbons in a subsurface region of interest. One aspect includes defining a basin analysis project within the subsurface region. The application of at least one basin analysis workflow to the basin analysis project is also described. In a final step, the results of the basin analysis are generated. The project results are used to optimize and manage the performance of technical tasks required for the basin analysis project to determine the accumulation of hydrocarbons in the subsurface region of interest. The patent application focuses on a method for the data processing of geological data. It offers multiple workflows for analyzing basin data. A simulation model, however, is not disclosed in the application. Even though the application has been abandoned, it must still be regarded when drafting a new application as it is prior art in the field. Especially the steps described for selecting a workflow might be of relevance.

U.S. Pat. No. 6,977,866 B2 (Bell et al.; assigned to ConocoPhillips Company) provides a methodology, process, and computer software for the prediction of fluid and rock pressures in the subsurface using geophysical and geological data. The method includes techniques for velocity analysis from seismic data that are used to drive the pressure prediction, as well as an integrated approach to deriving pressure data. The invention addresses the prediction of pressure information for three scales of analysis. First, the basin-scale (10-500 km spatial lengths) analysis of hydrocarbon systems, second the prospect-scale (1-10 km spatial length) analysis of fluid flow that can be used to analyze fluid movement in localized areas, and third the prediction of pressure conditions at a specific location (0-1 km spatial length) where a well is to be drilled. The results of the prediction can be utilized in a range of other applications that address the fundamental behavior of hydrocarbon systems and can improve the ability to find commercial quantities of hydrocarbons in the subsurface. The results can also be used to design and optimize well planning. The US patent describes a method for determining subsurface pressure gradients using a computer system for the calculation. The method focuses on the prediction of subsurface fluid and rock pressures and uses this information to predict the fluid flow in the subsurface structures. However, the patent remains silent on the formation of subsurface structures or the relevant fold movement.

SUMMARY OF THE INVENTION

A method and system for prediction of the presence of hydrocarbon accumulations in a subsurface geological area is disclosed in the present document. The method comprises the creation of a structural framework of the subsurface geological area using dynamic geological data and geophysical data. The dynamic geological data and geophysical data include, for example, data obtained from a multidisciplinary approach integrating well data, seismic data, potential data, and outcrop analogues in one structural framework.

The formation of folds using the structural framework stored in a memory are then calculated. The formation on the folds is a result of the compressional and tensional forces caused by the movement of large volumes of rock in the subsurface geological area. Calculating the folds comprises determining of the initial fold axes. Furthermore, calculating comprises addressing the axial plane and direction of heterogeneous shear displacement responding to the first folding and refolding phases. The compressional and tensional factor is estimated using the distance between fold axial surfaces and the structural framework, accomplishing footwall deformation during tectonic denudation via sub vertical simple shear. Detailed structural geometries of Abu Dhabi folds are analyzed.

Fault patterns for the folds are modeled based on the structural framework using the calculated compressional and tensional forces. The fault patterns can then be calculated for a wide variety of structure styles, allowing for the structural characterization of the entire Abu Dhabi tectonics. Relative fold movement of the folds is predicted using the fault patterns, and the formation of the hydrocarbon accumulations in the subsurface geological area is determined using the predicted fold movement and the structural framework. The method further allows for a three-dimensional seismic interpretation of the subsurface deformation in Abu Dhabi from a geometric and/or mechanical perspective, using interpretation techniques by analyzing multiple hypotheses for the formation of folds.

The system disclosed comprises an input device, a properties module, a processor, an estimation module, a locator module, and a memory. The input device is used for inputting ones of a plurality of geological data and geophysical data from different sources, for example data from magnetic sensors, gravity sensors, seismic data, as well as borehole logs and cores. The data obtained from the magnetic sensors can be referred to as magnetic data. The data obtained from the gravity sensors can be referred to as gravity data. The properties module is used for the structural framework using the inputted plurality of the geological data and geophysical data. The processor is used for the calculation of compressional and tensional forces leading to the fault patterns and a relative fold movement. The formation of the hydrocarbon accumulations is estimated using the estimation module. The locator module is then used for the determining of the presence of hydrocarbon accumulations.

DETAILED DESCRIPTION OF THE INVENTION

The invention will now be described on the basis of figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention. The present invention becomes more obvious when reading the following detailed descriptions of some examples as part of the disclosure under consideration of the enclosed drawings.

Figure 1:
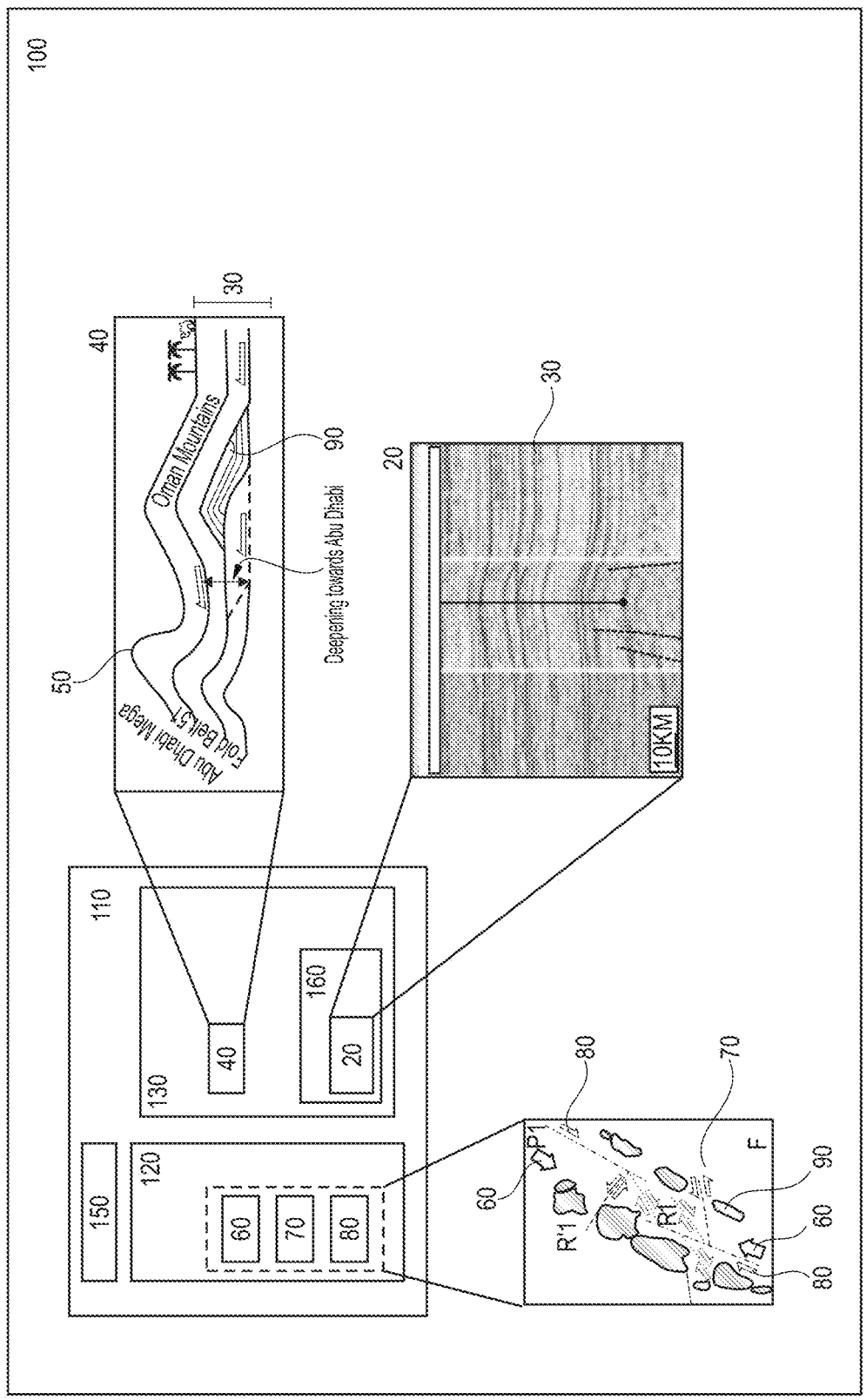
FIG. 1 shows a schematic view of a system for prediction of hydrocarbon accumulations in a subsurface geological area.

FIG. 1 shows a schematic view of a system 100 for prediction of hydrocarbon accumulations 90 in a subsurface geological area 30. The system 100 comprises a central unit 110 with a processor 120, a memory 130, and an input device 150. The input device 150 inputs data 40 obtained from different sources using a variety of sensor types. The data 40 includes, for example, data from magnetic sensors or gravity sensors, as well as seismic data, and data obtained from borehole logs and cores. The geological data can further include information on folds 50 or hydrocarbon accumulations 90 in the subsurface geological area 30. The memory 130 of the system 100 is used for storing of the data 40. The memory 130 is further used for storing a properties module 160 comprising at least one of a structural framework 20 containing information on the subsurface geological area 30. The processor 120 is used for the calculation of compressional and tensional forces 60, fault patterns 70, and relative fold movement 80. The relative fold movement 80 is then used for the prediction of the presence of hydrocarbon accumulations 90, as will be described later.

Figure 2A:
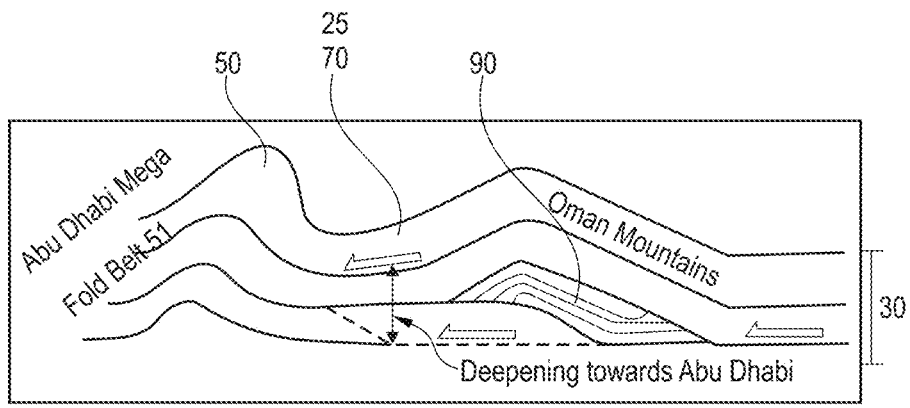
FIGS. 2A to 2G show a view of a geometric model showing the evolution of the folded anticlines 29 in Abu Dhabi onshore folded belt.

FIGS. 2A to 2G show a schematic view of the structural framework 20 which illustrates the evolution of hydrocarbon accumulations 90 in the Abu Dhabi region. FIG. 2A shows a cross-sectional overview of the subsurface geological area 30 featuring the hydrocarbon accumulations 90 of Abu Dhabi. Initially, the hydrocarbon accumulations 90 in the subsurface geological area 30 of the Cretaceous Systems were formed as one large structure. Evidence supporting this theory can be found in the data 40 used for the generation of the structural framework 20 disclosed in the present document. For example, the hydrocarbon accumulations 90 found in today's subsurface geological area 30 of Abu Dhabi show similar directions of expansion, show similar free water levels, are located at similar depths, and are connected by mutual hydrocarbon water contacts. Using the structural framework 20, a strong correlation between the estimated hydrocarbon accumulations 90 of the Cretaceous Systems and the hydrocarbon accumulations 90 of today's subsurface geological area 30 can be established. Establishing this connection is done using the method 10 for the determination of hydrocarbon accumulations 90, as will be shown below.

Figures 2B, 2C, 2D:
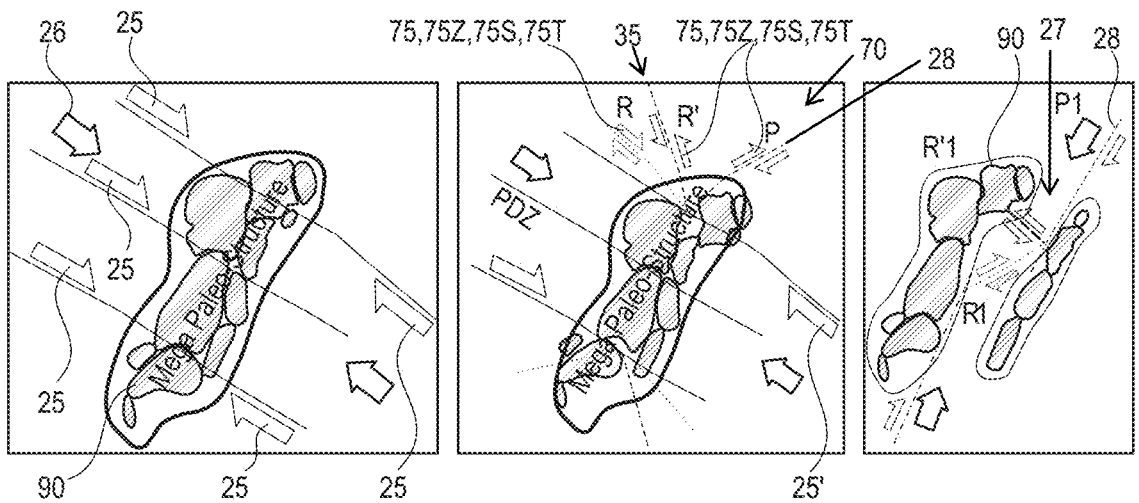

As shown in FIG. 2B, the late Cretaceous is characterized by a consistent presence of mechanical stresses 25 in the region of Abu Dhabi. The initial hydrocarbon accumulation 90, also referred to as the "Mega Paleo-Structure", of the Cretaceous Systems is subjected to these mechanical stresses 25.

As shown in FIG. 2C, faults 75 are created in the subsurface geological area 30 as a result of the presence of the mechanical stresses 25. The faults 75 describe a fracture or displacement between two or more subsurface volumes of the subsurface geological area 30. The faults 75 are typically found in areas of displacement of rock caused by mechanical stress 25 or mechanical strain 26. Subsequently, during the late Cretaceous, fault zones 75Z or entire fault systems 75S of interacting fault zones 75Z were created. FIG. 2B further show first fault patterns 70 leading to a changing shape of the hydrocarbon accumulation 90. The subsurface geological area 30 is impacted by the mechanical stresses 25 trending in the direction of ~N60° W. These horizontal mechanical stresses 25 show a significant change in direction to NE-SW during the Tertiary period [3]. The faults 75 present in the Tertiary period, as a result of the fault systems 75S, are vertically and laterally segmented having small offsets generally measuring less than 25 m. As a result, the faults 75 predominantly occur in the two distinct types of crestal arrays and echelon arrays. The crestal arrays are usually clustered along and restricted to anticlinal crests. The echelon arrays describe the faults 75 caused by rotation of subsurface geological areas 30 showing a distinct pattern 35. Linear fault zones 75Z consisting of the echelon arrays as seen in segments of the faults 75 can be found in Abu Dhabi extending for nearly 100 km.

The fault zones 75Z found in Abu Dhabi define two conjugate trends of strike-slip faults. These trends show regionally consistent orientations and kinematics. The first trend can be described as NW-trending (~N45° W) sinistral fault zones 75Z, also called a left-lateral slip fault. The second trend can be described as WNW-trending (~N75° W) dextral fault zones 75Z with mixed extension and compression, also called a right-lateral slip fault. These trends cause deformation zones forming depressions up to several kilometers wide and can be identified using seismic reflection methods. Most of these faults 75 and the fault zones 75Z are observed to be deep-seated within the subsurface geological area 30.

FIG. 2C further shows the NW-SE inherited Najd Principal Deformation Zone, or PDZ. The PDZ evolved with the associated shears leading to the P-shears 28 taking the lead of stresses that formed the intra-basins. Separation is continued with the reactivation and the PDZ taking the lead formed and separated between the anticlinal folds 50 in Abu Dhabi. Most of the present-day faults 75 are averaging 2 km in length. The largest faults 75 mapped measure up to 10 km tip-to-tip. The vertical dimensions of most faults 75 are small, commonly not exceeding several hundred milliseconds.

FIG. 2D shows the Mega-Shear Faults 75 as being inherited strike slip faults 75. These mega-shear faults 75 are overprinting Abu Dhabi tectonic distributed in the Abu Dhabi fold belt and have resulted in dislocation of the axial traces of some of the folded structures. These faults are typically conjugate sets of shear faults 75 with dominant NW and NE strike directions. The mega-shear faults 75 are part of the fault patterns 70 developed during the folding phenomena of the different periods. The mega-shear faults 75 were subsequently affected by the strike movement and influenced by the wrench shear zones 27 found in the fault zones 75Z at western terminus of the Oman Mountains (see also FIG. 2A). The mega-shear faults 75 have, combined with an eastward compressional movement, formed the Abu Dhabi mega-fold belt 51 (ADMFB). In the geological periods following the formation of the mega-fold belt 51, the inherited NW-SE strike slip faults 75 were reactivated leading to a dissection of the mega-fold belt 51. These mega-shear faults 75 can be identified on both, magnetic lines, and seismic lines, oriented perpendicular to the axis of the mega folds.

A significant displacement of the subsurface geological area 30 has led to the dissection of the hydrocarbon accumulations 90. The displacement can be observed along the mega-shear faults 75 in the Abu Dhabi fold belt. However, a compartmentalization of this structure is created, as the structure is laterally sealed off by different rock formations due to complex juxtaposition across the mega-shear faults 75. This juxtaposition has led to the stacked reservoirs found in today's Abu Dhabi subsurface geological area 30. The mega-shear faults 75 extend to significant depths and are older than the compressional and tensional forces 60 that have created the folds 50, which are referred to as the Oman Mountains today. These compressional and tensional forces 60 leading to forming the mega-fold belt 51 were faster than the reactivation of the inherited strike slip faults 75. This difference in forming velocity has preserved larger groups of the hydrocarbon accumulations 90 from the dissection by the strike slip faults 75 forming the Oman Mountains. Therefore, large parts of the hydrocarbon accumulations 90 in the subsurface geological area 30 associated with the mega-fold belt 51 can be found today.

Figures 2E, 2F, 2G:
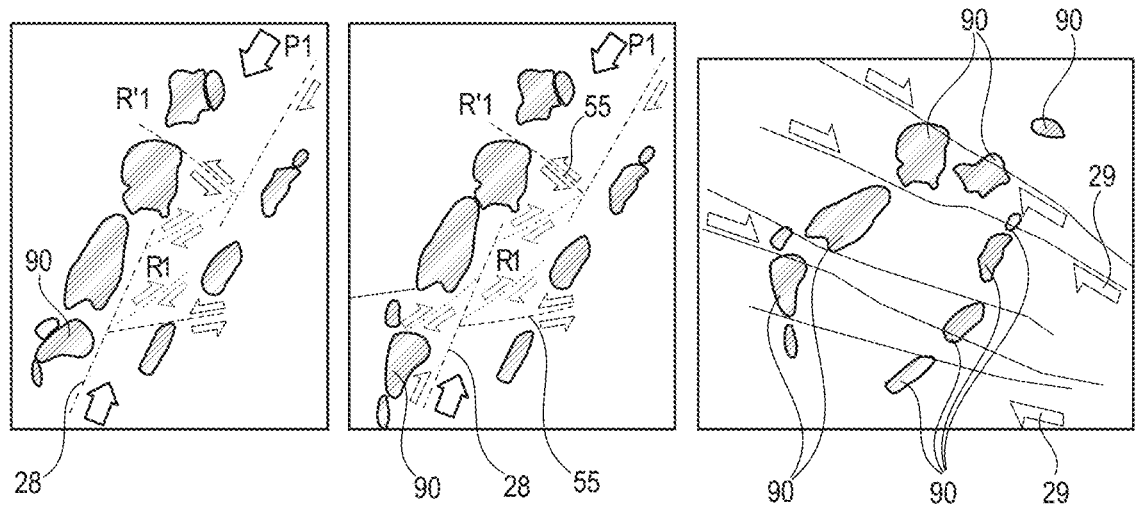

As shown in FIG. 2E, regional strike-slip movements due to wrench shear zones 27 dissected the mega-fold belt 51 and these strike-slip movements cause the transpressional deformation of the mega-fold belt 51. In this region, conjugate sets of mega-shear faults 75 are mostly affected by the regional sinistral fault zones 75Z, but occasionally dextral fault zones 75Z can also be found. The mega-shear faults 75 in the area of the mega-fold belt 51 are therefore mostly strike-slip faults 75 developed by anomalous horizontal displacement that occurred along the shear faults 75 associated with the folds 50. Lateral displacement along these mega-shear faults 75 has dislocated the axial traces of the various anticlines 29 in the Abu Dhabi fold belt. These intricacies have to be considered when establishing the structural framework 20 of the subsurface geological area 30.

As shown in FIG. 2F, the mega-fold belt 51 forms part of NENE-trending folds 50. The mega-fold belt 51 further forms a thrust belt 55 linking the Oman Mountains with the mega-fold belt 51 through thrusting, folding, and reactivation of inherited NW-trending faulting zones 75Z. The mega-fold belt 51 is an arc-shaped belt convex to the north. The mega-fold belt 51 is limited to the west and east by troughs formed as pull-apart-basins between the mega-shear faults 75. This means the structures found in the mega-fold belt 51 are developed by obduction of the layers in the subsurface geological area 30 caused by the northward movement of the Oman Mountains. Therefore, the mega-fold belt 51 can be considered a broad and gentle fold 50 formed due to the subduction of the thrust belt 55 to the west towards the Iranian plate. The thrust belt 51 is still tectonically active today.

As can be seen in FIG. 2G, the structural framework 20 suggests that the folded anticlines 29 started as a mega-structure of the anticlines 29, which then dissected into smaller ones of the anticlines 29 leading to the dissection of the hydrocarbon accumulation 90 into individual hydrocarbon entrapments. The structural framework 20 describes the evolution as the mega folded structure of anticlines 29 formed due to compressional regime between the Arabian and Indian plates that reactivated the inherited Najd fault system 75S. Uplift and compression in the mega-fold belt 51 have been episodic since the Carboniferous period with the onset of the Hercynian orogeny, but the main phase of compression and uplift was during the late Cretaceous period to the Paleocene period. Fault systems 75S associated with the folding were also developed during the folding. Subsequently, the fault systems 75S associated with the folds 50 have been influenced by the regional strike-slip movement related to wrench shear zones 27 causing the formation of wrench fault systems 75S.

Figure 3:
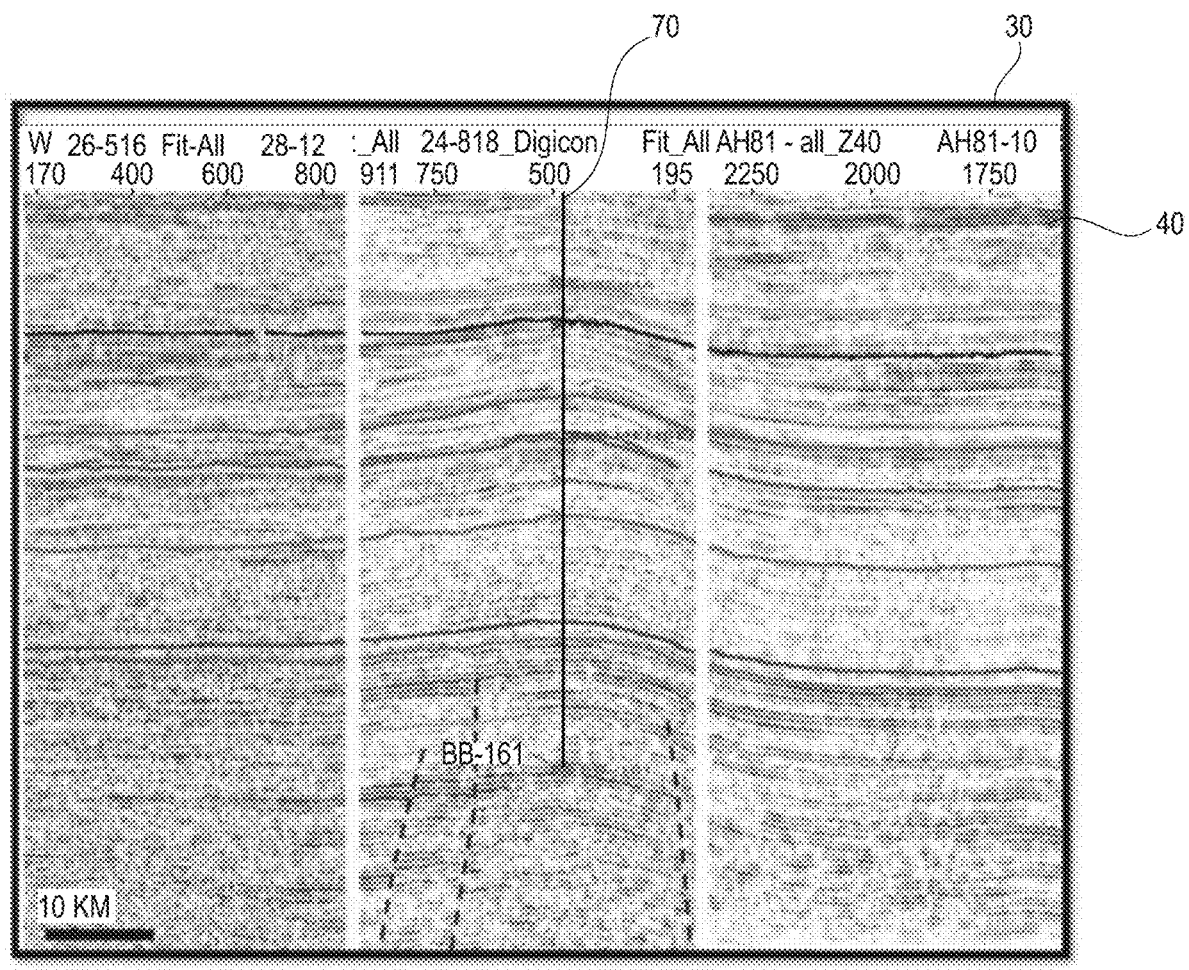
FIG. 3 shows a view of Faults in pre-Khuff are mainly normal extensional.

FIG. 3 shows that throughout the Arabian plate and therefore most of the Gulf-Countries, a more-or-less significant sedimentary hiatus separates the continental early Permian sequence from the older sedimentary formations (Khuff Formation) [4, 5]. This hiatus and related unconformity is generally referred to the "Hercynian unconformity". ADNOC field work in Ras Al Khaima and Musandam region confirms the existence of an angular unconformity below the Lower Permian formation. Surprisingly, the structures sealed by this unconformity are normal faults 75 or tilted blocks without any evidence of compressional deformation. This observation raises the question of the significance of Hercynian unconformity in Abu Dhabi, the Oman Mountains, and, on a larger scale, in the Arabian plate in general. The mega-fold belt 51 belongs to the Oman Mountains Fold-and-thrust belt, which extends for kilometers.

Figure 4A:
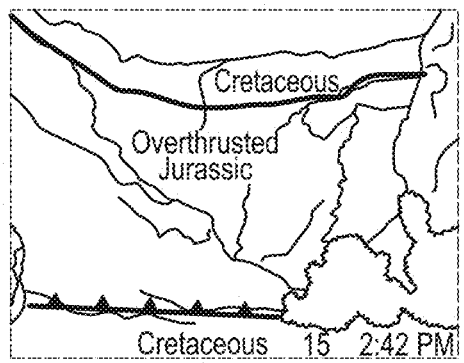
FIGS. 4A, 4B, and 4C show a view of Thrusted Jurassic over Cretaceous of Ras Al Khaima.
Figure 4B:
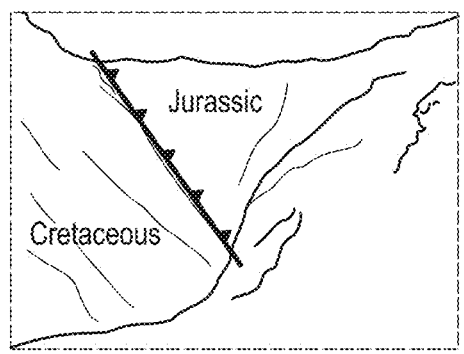
Figure 4C:
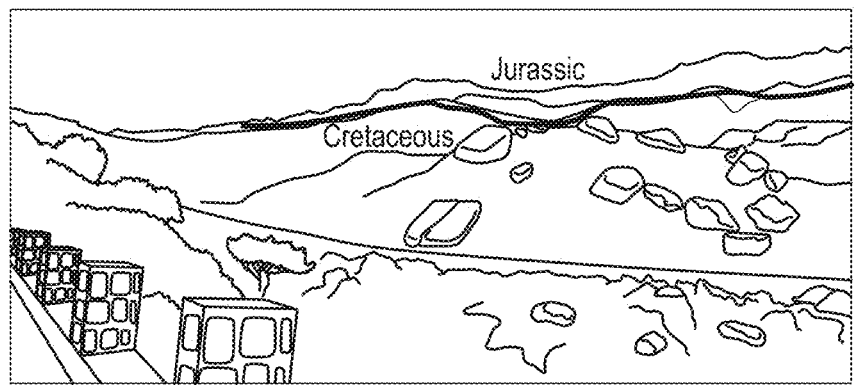

As shown in FIGS. 4A to 4C, the mega-fold belt 51 is a continuous NE-SW initiated system of folds 50 found in the zones of the Oman Mountains with the highest rates of uplifted topography. The thrust belt 55 is carrying Lower Paleozoic strata over Mesozoic or Cenozoic sediments. Following this definition, the thrusting does not exist everywhere along the mega-fold belt 51 and it is rarely observed in the subsurface geological area 30, but mainly in the outcrops of the Musandam-Ras Al Khaima-Oman Mountains. In the Musandam-Ras Al Khaima forms, a complex network of branching faults 75 combining pure reverse faults 75 in association with right-lateral strike-slip faults 75 allow large exposures of Paleozoic rocks. The anticlines 29 of the mega-fold belt 51 are separated by the Falaha syncline and limited to the east and west by synclinal basins. Lower Paleozoic rocks are only known from sparse well-bore penetrations but have not been found in outcrops formed by the extensional faulting of pre-Khuff. At the bottom of the sedimentary pile in the geological data, the existence of Hormuz salt of the late Precambrian or the early Cambrian age was not proofed. The salt is deposited in an evaporitic basin located mainly in the offshore areas and the hydrocarbon accumulations 90 found in those regions are located close to the areas having salt diapirs. The salt basins of the salt diapirs seem to follow the trend of the central Arabian Gulf as indicated by the presence of several salt piercements [6, 7, 8]. The Hormouz salt basin in the Arabian Gulf did not evolve in an onshore direction, mainly due to the unfavorable conditions for movement of salt in this direction. The main compressional and tensional forces causing the faults 75 are NE-trending, away from Oman. The NE-trending movement of the faults 75 can therefore also be found to extend into the Zagros mountains bordering the north east of the Arabian plate. The onshore the mega-fold belt 51 of Abu Dhabi are related to the Hercynian orogeny, while the offshore fields are related to Hormuz salt diapirs. Therefore, the fold belts are following tectonic trends. Even though the offshore fields are typically scattered, there are some indications showing that salt is formed due coupling of tectonics and salt movement that is triggered by the faults 75. Furthermore, the main salt basins in Oman (Fahud, Ghaba, and south salt basin) are also trending NE-SW [9, 10, 11, 12]. The salt movement has started after the Hyrcenian period and has mainly taken place in the Turonian period, the later showing strong compressional and tensional forces 60.

Figure 5:
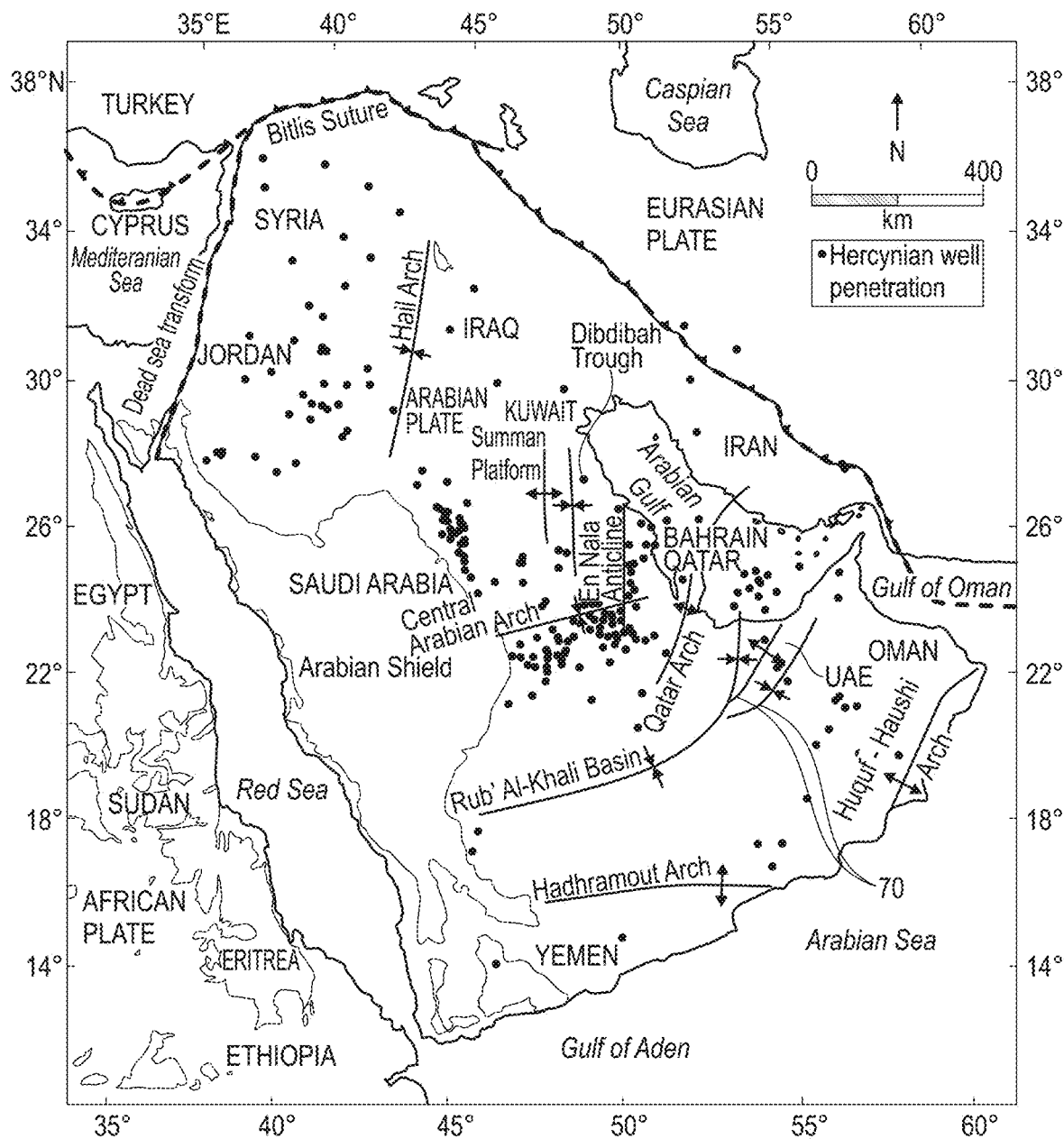
FIG. 5 shows a map of the Arabian plate showing plate boundaries, major structural elements and well data used in the Hercynian sub-crop revision.

As can be seen in FIG. 5, the Abu Dhabi fold belt is found having long wavelength and low amplitude of pre-Permian folds 50 forming the so-called Paleozoic arches (or uplift) and intermediary basins well-known in Arabia [4, 13] or North Africa [14]. Three main or primary arches and two main or primary basins can be found on the Arabian plate. The primary arches are, counting from the west to the east, the Levant, the Al-Batin, and the Hadhramaut-Oman arches. The two primary basins are the Nafud-Ma'aniya, and the Faydah-Jafurah basins located between the three arches [13]. Within these primary basins, some secondary places, like the Qatar arch or the Ghawar High are present. The mega-fold belt 51 of Abu Dhabi is located on the Arabian plate and is, on the east and the west, surrounded by the Rub Al Khali basin. Therefore, the region of Shaybah-Asab can also be considered to be part of the Abu Dhabi fold belt that runs parallel to the Qaar Arch and the Huquf-Haushi arches.

The age of the Unayzah formation has been reported as having been formed in the Upper Carboniferous to the Lower Permian in Saudi Arabia [4]. The pre-Permian unconformity and the sealed tilted blocks in Abu Dhabi showing the post-Permian features in the subsurface geological area 30 are overlined by the pre-Permian layers as a "layer cake". In fact, and as indicated above, not only a considerable sedimentary hiatus separates the Lower Paleozoic from the Upper Paleozoic rocks, but also the Lower Paleozoic rocks have been tilted and truncated before the deposition of the Permian sediments. Based on field observations, the mean dip of the Lower Paleozoic rocks at an angle of 45° ENE is significantly higher than the dip of the Upper Paleozoic at an angle of 10° ENE.

In contrast, it is worth noting the absence of an unconformity between the Upper Permian and the overlying Mesozoic rocks. Following along a strike, the basal thrust of Ras Al Khaima, which is a segment of the Hegab thrust, the lateral Triassic-Jurassic is overlined by the Cretaceous rocks (see also FIGS. 4A to 4C). The whole subsurface geological area 30, i.e. the Lower Paleozoic and the unconformable Permian to Cenozoic cover has been uplifted and thrusted toward the NW-direction during the Hercynian orogeny. The local increase in fault 75 density and throw near fold 50 axes implies a genetic relationship between the folding and the faulting. The throw of a fault 75, also called a fault-throw 75T, describes the vertical component of the displacement of the subsurface geological area 30.

Locally increased mechanical strain 26 above a neutral surface due to fold-related flexure is predicted to be the driving the mechanism behind this observed spatial relationship, especially in the context of the regionally consistent area of the mechanical stress 25 with the horizontal sigma-1 stresses oriented N60° W. At the larger scale, crustal-scale basins, arches, and monoclines define the overall basin architecture having wavelengths of multiple hundreds of kilometers. Looking at the scale of the hydrocarbon accumulations 90, domal and elongated folds 50 can be found forming the main hydrocarbon accumulations 90. These domal and elongated folds 50 show wavelengths of many tens of kilometers and amplitudes of hundreds of meters.

Smaller-scale folds 50 with wavelengths of up to several kilometers and amplitudes of a few tens of meters are observed in association with the larger-scale deformation of the subsurface geological area 30. These smaller-scale folds 50 show two distinct orientations. Firstly, WNW-striking structures are closely related to the observed fault zones 75Z and, secondly, the second, NNE-striking structures are unrelated to seismically resolved faults 75. The relationship of these folds 50 between the folding mechanisms and the faults 75 is quantified in the structural framework 20 based on the seismic data and the well data obtained for the composite layers of the subsurface geological area 30.

The line between the WNW-striking structures and the NNE-striking structures indicates the apparent decrease of the maximum fault-throw 75T with distance from the fold-axis. From a maximum of about 120 ft (36.6 m) near the fold-axis, the fault-throw 75T de-creases to less than 20 ft (6.1 m) at 6 km from the fold-axis. Scatter of the measured fault-throw 75T at individual wells are interpreted as an expression of the segmentation of the faults 75.

Wells intersect faults 75 at various positions within the Arabian plate. The fault-throws 75T can be found in different locations. Some of the fault-throws 75T can be found in locations closer to points of higher displacement, other fault-throws 75T can be found closer to the fault tip lines. The average measured throw dimension in wells is approximately 12 m. Given the 1.4 km average strike length of faults 75 in the Arabian plate, the vertical displacement ratio for the average fault 75, also called the length-to-throw, is slightly more than 100 ft (or 30.48 m), in line with measured averages for rocks elsewhere.

Figure 6:
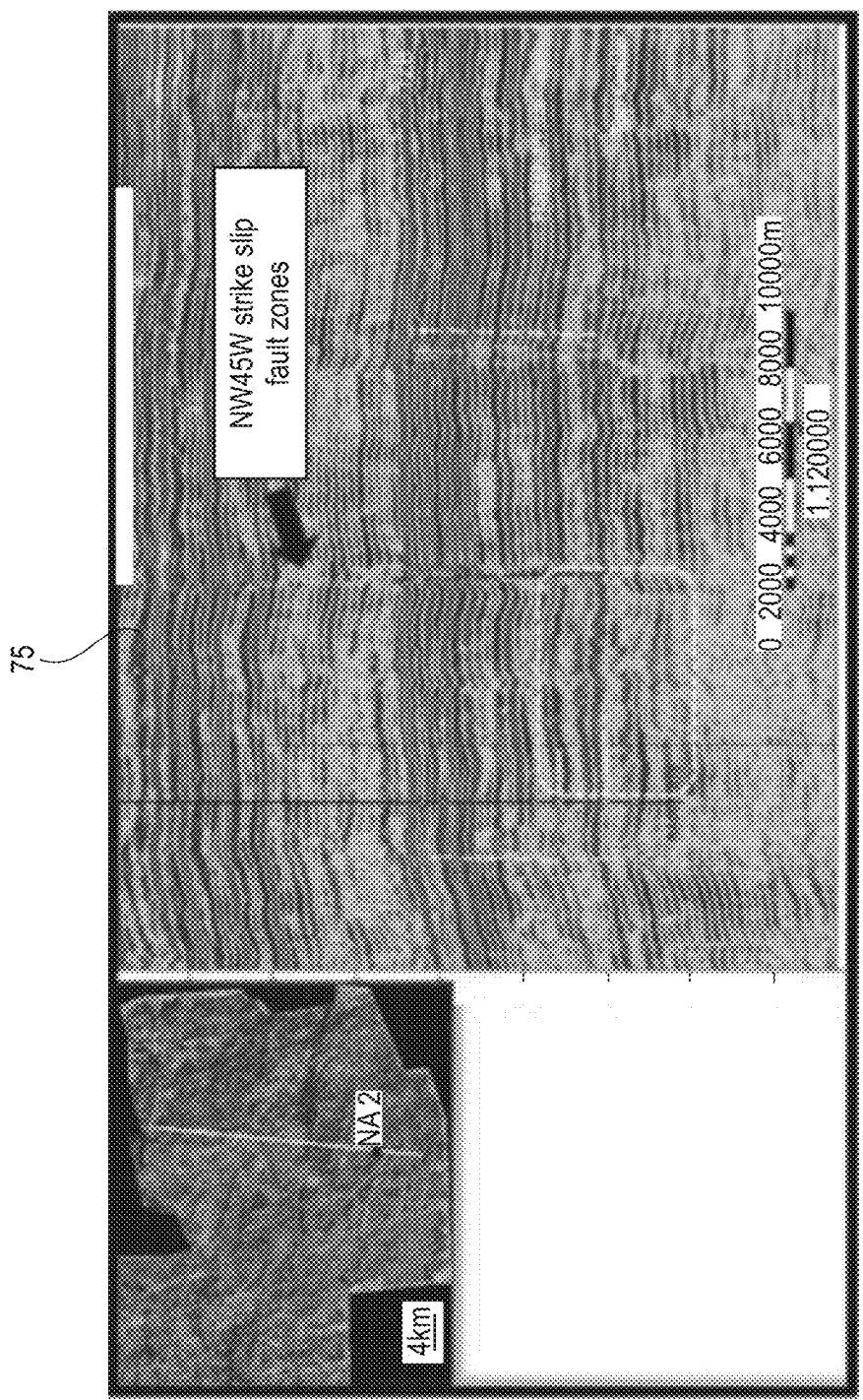
FIG. 6 shows faults that are vertically deep seated.

As can be seen in FIG. 6, most of the faults 75 found in the Abu Dhabi region today are averaging 2 km in length. However, the largest faults 75 mapped in the Abu Dhabi region measure up to 10 km tip-to-tip in a horizontal direction. The vertical dimensions of most faults 75 are small, commonly not exceeding several hundred milliseconds.

Figure 7:
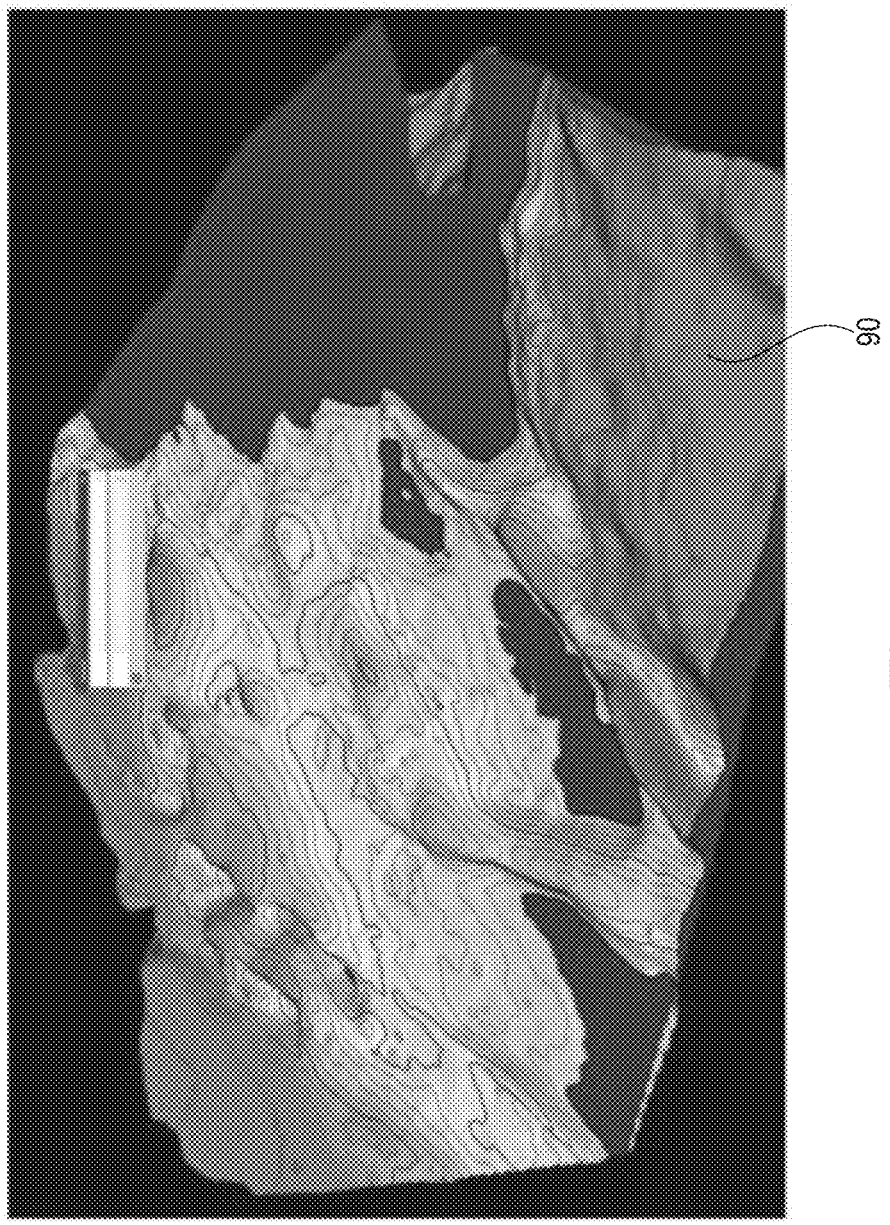
FIG. 7 shows a simulation of Abu Dhabi fields sharing one contour interval.

As shown in FIG. 7, the three main tectonic events related to the Abu Dhabi collision with Oman and post-collision evolution, as described above, have been identified through the wrench movements on the inherited Najd fault system 75S. These Najd fault systems 75S represent the oldest mega-shear faults 75 in the Arabian plate. The correlation of these events throughout the formation mega-fold belt 51 with the forces from the Oman side leads to the prediction of an indent-type structure for the subsurface geological area 30 of Abu Dhabi. This prediction comprises comparing a relative fold movement 80 of the folds 50, as described above, using the fault patterns 70 of the subsurface geological area 30 of the method 10.

The structural framework 20 representing the subsurface geological area 30 of Abu Dhabi enables to calculate the formation of the indent-type structure. This calculation suggests the existence of a rigid microplate in today's area of Abu Dhabi which collided with the Oman Mountains until the late Cretaceous. The collision resulted in compressional and tensional forces 60 leading to the formation of the thrust belt 55, as described above. The thrust belt 55 transferred mechanical stresses 25 and mechanical strains 26 laterally, leading to the reactivation of the Najd inherited faults 75. The compressional and tensional forces 60 present at the late Cretaceous led to the formation of the mega-fold belt 51.

The mega-fold belt 51 was then dissected by the wrench faults 75 appearing parallel to the Najd fault systems 75S. Subsequently, the mega-fold belt 51 was mobilized by related shear zones in the subsurface geological area 30. The regional anti-clockwise rotation of the subsurface geological area 30 containing the newly stabilized domain suggests that the collision with the Oman Mountains was active until the late Cretaceous.

The mega-fold belt 51 incorporates the hydrocarbon accumulations 90 found in today's Abu Dhabi onshore subsurface geological areas 30. The mega-fold belt 51 further incorporates some of the offshore hydrocarbon accumulations 90, especially those closer to the shoreline of Abu Dhabi. The mega-fold belt 51 was fully assembled by the late Triassic period and the first stage of the mega-fold belt's 51 breakup began in the mid Cretaceous.

The hydrocarbon accumulations 90 in the area of Abu Dhabi are incorporated in one contour of the subsurface geological area 30. The shapes of the hydrocarbon accumulations 90 found in the onshore regions of Abu Dhabi can be determined using the method 10 outlined in this document as will be elaborated in the description of FIG. 9. First evaluations of the method show a prediction of the onshore hydrocarbon accumulations 90 when using the method 10. The method 10 can also be used for hydrocarbon accumulations 90 in other areas or other continents showing similar subsurface geological properties. This can be explained using the concept of the formation of the landmasses. According to this theory, most of the earth's landmass was initially a single structure called the Pangaea, or Pangea.

Figure 8:
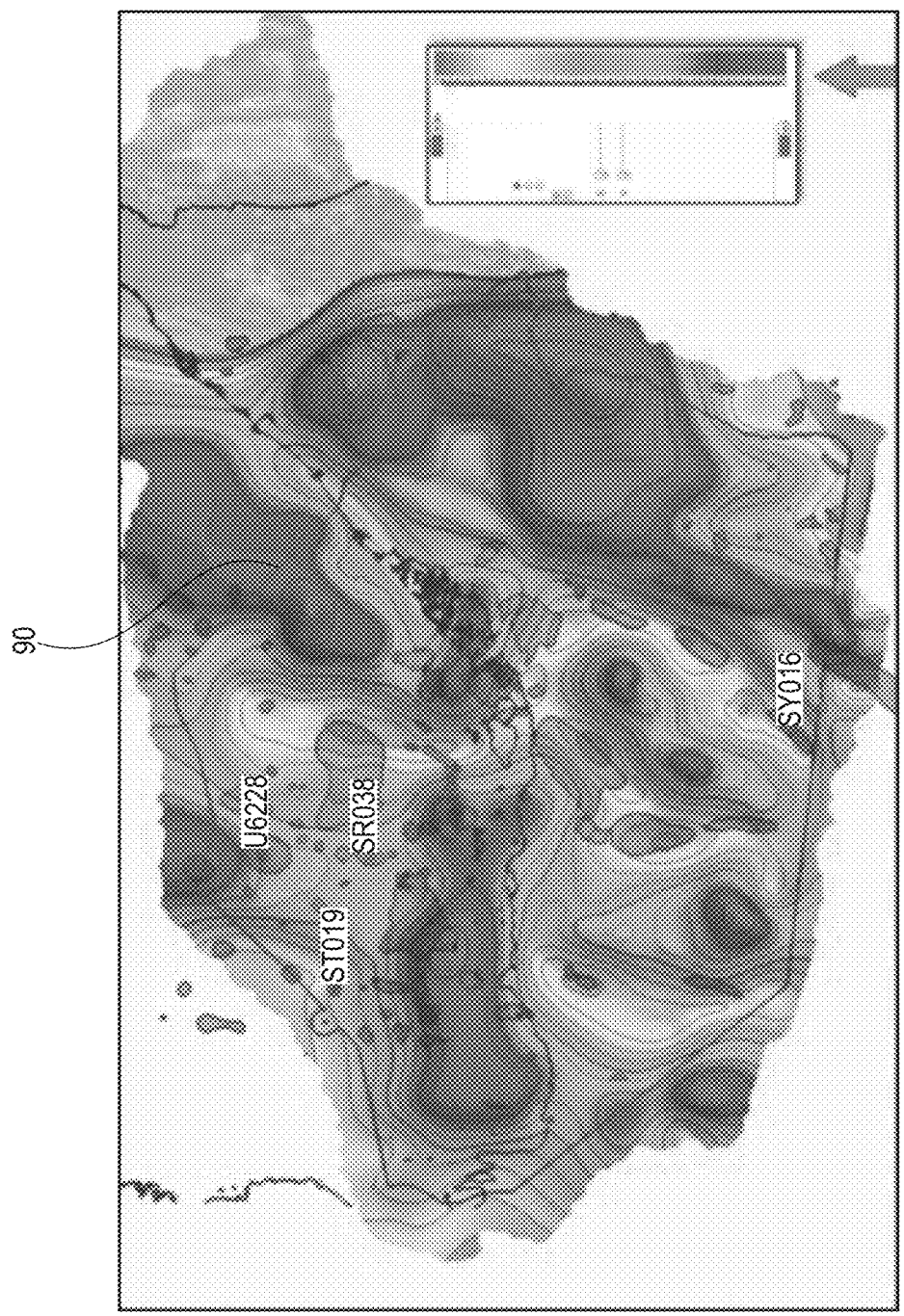
FIG. 8 shows a map showing basement highs in the Abu Dhabi Fold Belt.

The method 10 for the determination of hydrocarbon accumulations 90 is outlined in FIG. 8. Using the method 10, the location of the today's hydrocarbon accumulations 90 can be traced back to the single hydrocarbon accumulation 90 of the Cretaceous Systems, also referred to as the "Mega Paleo-Structure".

Figure 9:
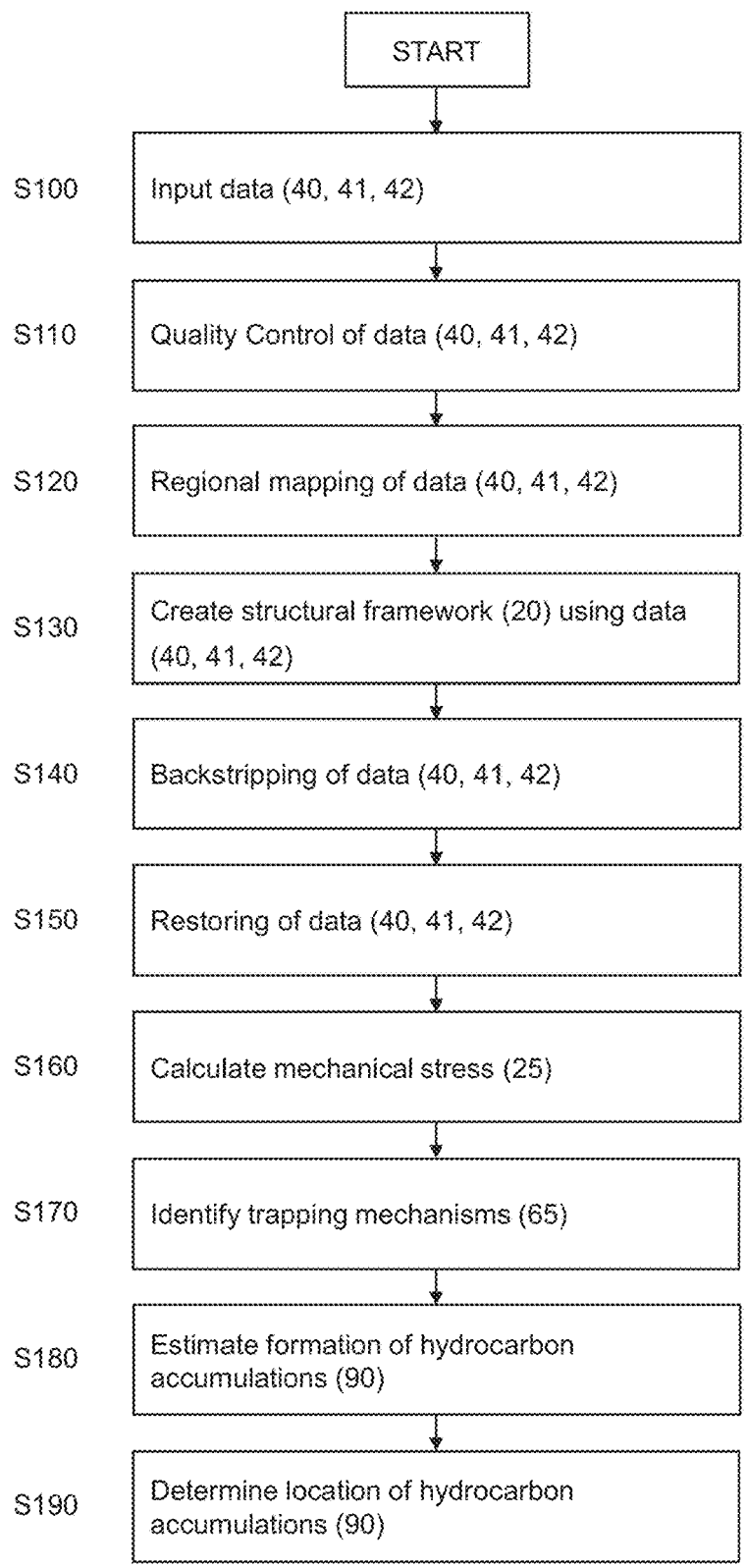
FIG. 9 shows a flow chart describing the method of operation for the determination of hydrocarbon accumulations in a subsurface geological area.

FIG. 9 shows a flow chart describing the method 10. In step S100, the data 40 including the geological data 41 and the geophysical data 42 is input using the input device 150 and stored in the memory 130 using the processor 120. The data 40 includes, for example, magnetic data and/or gravity data, as well as seismic data, and data obtained from borehole logs and cores. The data 40 can further include information on folds 50 or hydrocarbon accumulations 90 in the subsurface geological area 30.

A quality control for the data 40 is conducted in step S110 after the input of the data 40. The quality control includes, for example, additional processing of the data 40 such as noise control, scaling of the data 40, or applying filters to the data 40. The quality control can be conducted by a pre-defined program or algorithm stored in the memory 130. The data 40 is, in step S120, mapped to the areas of the subsurface geological area 30 used in the structural framework 20. Mapping involves plotting and defining the location of the obtained data 40 in the structural framework 20. Mapping is therefore used to match and align the data 40 to a virtual map of the subsurface geological area 30 in the stored in the structural framework 20.

In step S130 the structural framework 20 is created using the mapped data 40. The creating of the structural framework 20 includes a structural validation of the data 40 and a facies characterization of the data 40. The structural validation of the data 40 describes the estimation of the reliability of the data 40. The reliability of the data 40 can be estimated using different models or factors such as, for example, a coherence of data sets over a period of time. The facies characterization of the data 40 includes identifying separate volumes or bodies of rock in the subsurface geological area 30. The identifying includes splitting similar sets of data 40 indicating single bodies of rock into distinguishable formations (or units) in terms of, for example, physical characteristics, composition, or various other attributes. The characterized facies can be used to establish different formations of rock from adjacent formations within a contiguous body of rock by physical, chemical, or biological means.

The data 40 is analyzed and backstripped in step S140 using the processor 120. Backstripping includes quantitatively estimating the thickness of the characterized facies at the point of initial formation or deposition. Quantitatively estimating the thickness of the facies includes calculating the deposition of sediment and the erosion of the sediment over time. The estimation of the backstripping allows to determine the initial thickness and mechanical characteristics of the facies in the subsurface geological area 30. Using the calculated characteristics of the facies which were present at the time of the deposition, the mechanical stress 25 and the mechanical strain 26 can be calculated.

In step S150, the facies of the subsurface geological area 30 are restored. Restoring includes progressively undeforming the facies or bodies of rock in order to validate the interpretation used to build the structural framework 20. Progressively undeforming describes the process of a backwards calculation of today's subsurface geological areas 30. The undeforming is done calculating the initial shape of the layers in the subsurface geological areas 30 before they were subjected to the described forces. The restoring can be done using computer software programs such as, for example, Petrel Seismic Interpretation or MOVE.

The mechanical stress 25 for the subsurface geological area 30 can be calculated by the processor 130 in step S160, using the structural framework 20 and the backstripped and restored data 40. The structural framework 20 contains information regarding the geological properties of the subsurface geological area 30 such as, for example, crestal arrays, fault zones, deformation zones, or the presence of wrench-shear-zones. The calculated mechanical stresses 25 include compressional and tensional forces 60 which are calculated by the processor 120 using the structural framework 20. The compressional and tensional forces 60 are a major contributor to the dissection of the hydrocarbon accumulations 90, also referred to as "traps", in the subsurface geological area 30, as already explained above. The compressional and tensional forces 60 result from a multitude of geological events over the duration of the different geological periods.

Trapping mechanisms 65 are identified by the processor 120 using the calculated mechanical stress 25 and the structural framework 20 in step S170. The trapping mechanisms 65 describe the mechanisms involved in the formation of the hydrocarbon accumulations 90 due to the compressional and tensional forces 60 present in the subsurface geological area 30. Calculating the trapping mechanisms 65 requires detailed information on the mechanical properties of the subsurface geological area 30 stored in the structural framework 20. The fault patterns 70 are modeled for the folds 50 using the calculated compressional and tensional forces 60 in order to obtain detailed information on the mechanical properties of the subsurface geological area 30. The fault patterns 70 are indicative of the subsurface movement of the shears 28 and faults 75, also called the mega-shear faults 75, yielding information on the dislocation of the axial traces of some of the faults. The fault patterns 70 are expressed, for example, as vector-based data in the structural framework 20.

In step S180 the formation of the hydrocarbon accumulations 90 is estimated using the relative fold movement 80 of the folds 50. Estimating is done by the processor 120 using the identified trapping mechanisms 65 and the structural framework 20. For example, the Abu Dhabi fold, belonging to the mega-fold belt 51 as well as the thrust-belt 55 of the Oman Mountains, extends for kilometers as described above. Predicting the fold movement is done using the fault patterns 70 incorporating the trending fold-belts 55 and the positioning of the anticlines 29 in the subsurface geological area 30. The formation of the hydrocarbon accumulations 90 is estimated based on the trapping mechanism 65 indicated in step S170 using the predicted fold movement 80 and the structural framework 20. The structural framework 20 can be calibrated using present day data for the subsurface geological area 30. Calibrating can comprise multiple iterations of the modeling and calculating until the simulated properties of today's subsurface geological area 30 match the properties of the subsurface geological area 30 as found in the different sets of data from, for example, magnetic sensors, gravity sensors, seismic data, as well as borehole logs and cores. The hydrocarbon accumulations 90 are dissected by the relative fold movement 80 as described above.

Using the fault patterns 70, an explanation for today's location of the hydrocarbon accumulations 90 can be determined in step S190.

REFERENCES

[1] Noweir, M. Atef. "Back-thrust Origin of the Hafit Structure, Northern Oman Mountain Front, United Arab Emirates." GeoArabia 5 (2000): 215-228.
[2] Noweir, M. Atef et al. "Structural Style and Stratigraphy of the Huwayyah Anti-cline: An Example of an Al-Ain Tertiary Fold, Northern Oman Mountains". GeoArabia 5 (2000), 387-402.
[3] Noufal, Abdelwahab et al. "Tectonic Map of Abu Dhabi, UAE." and "Abu Dhabi Stress Map, UAE." Papers presented at the Abu Dhabi International Petroleum Exhibition and Conference, Abu Dhabi, UAE, 7-10 Nov. 2016.
[4] Konert, Geert et al. "Paleozoic Stratigraphy and Hydrocarbon Habitat of the Arabian Plate." GeoArabia 6 (2001): 407-442.
[5] Johnson, C. L. et al. Sedimentary response to arc-continent collision, Permian, southern Mongolia. Geological Society of America Special Papers 436, 363-390 (2008).
[6] Obaid, Khalid et al. "Enhanced Interpretation Of Salt-Related Structures In Abu Dhabi Using Improved Seismic Data Processing And Interpretation Techniques." Paper presented at the Abu Dhabi International Petroleum Exhibition and Conference, Abu Dhabi, UAE, 10-13 Nov. 2014.
[7] Noufal, Abdelwahab; Shebl, Hesham. "Halokinesis Stimuluses on Petroleum System of Abu Dhabi." Paper presented at the Abu Dhabi International Petroleum Exhibition and Conference, Abu Dhabi, UAE, 11-14 Nov. 2019.
[8] Arfan, Ali et al. "Maximizing Hydrocarbon Recovery and Water Injection Support through Pattern Reviews Between Injector Producer Pairs in a Large, Complex, and Faulted Brown Field in SE Asia." Paper presented at the Abu Dhabi International Petroleum Exhibition and Conference, Abu Dhabi, UAE, 09-12 Nov. 2020.
[9] Al-Barwani B, McClay KR "Salt tectonics in the Thumrait area, in the southern part of the South Oman Basin: implications for mine-basin evolution." GeoArabia 13 (2008): 77-108.
[10] Al-Siyabi, Hisham A. "Exploration history of the Ara intrasalt carbonate stringers in the South Oman Salt Basin." GeoArabia 10(4) (2005): 39-72.
[11] Loosveld, Ramont et al. "The Tectonic Evolution of Interior Oman." GeoArabia 1(1) (1996): 28-51.
[12] Droste, Henk. "Sequence-stratigraphic framework of the Aptian Shu'aiba Formation in the Sultanate of Oman." GeoArabia Special Publication 4(1) (2010): 229-283.
[13] Faqira, Mohammad et al. "New insights into the Hercynian Orogeny, and their implications for the Paleozoic Hydrocarbon System in the Arabian Plate." Geoarabia 14 (2009): "199-228".
[14] Boote, David. R. D. et al. "Paleozoic petroleum systems of North Africa." In Geological Society, London, Special Publications 132 (1998):7-68.

REFERENCE NUMERALS

10 method
20 structural framework
25 mechanical stress
26 mechanical strain
27 wrench shear zones
28 shears
30 subsurface geological area
35 pattern
40 data
41 geological data
42 geophysical data
45 geological structure
50 folds
60 compressional and tensional forces
65 trapping mechanism
70 fault patterns
75 fault
75T fault-throw
75Z fault zones
75S fault systems
80 relative fold movement
90 hydrocarbon accumulations
100 system
110 central unit
120 processor
130 memory
140 display unit
150 input device
160 properties module

The invention claimed is:

1. A method for determination of hydrocarbon accumulations in a subsurface geological area, the method comprising:
    mapping data to a region of the subsurface geological area, the data comprising at least one of geological data and geophysical data;
    creating a structural framework of the subsurface geological area using the data, wherein creating the structural framework comprises estimating one of initial fold axes, an axial plane, and a direction of heterogenous shear displacement resulting from a folding phase that includes a refolding phase;

calculating a mechanical stress resulting from compressional and tensional forces in the region of the subsurface geological area using the structural framework;

identifying trapping mechanisms causing a formation of the hydrocarbon accumulations using the compressional and tensional forces, the structural framework, and a processor;

estimating the formation of the hydrocarbon accumulations in the subsurface geological area using the trapping mechanisms and the structural framework; and determining a location of the hydrocarbon accumulations using the formation of the hydrocarbon accumulations and the structural framework.

2. The method of claim 1, wherein:

mapping the data comprises assessment of at least one of magnetic data, gravitational data, or seismic data.

3. The method of claim 1, wherein:

creating the structural framework comprises analyzing the subsurface geological area.

4. The method according to claim 1, wherein:

the compressional and tensional forces are calculated using the data and the structural framework.

5. The method according to claim 1, further comprising:

backstripping the data by determining an initial thickness and mechanical characteristics of layers in the subsurface geological area.

6. The method according to claim 1, further comprising:

restoring the data by progressively undeforming, using the processor, layers in the subsurface geological area for validation of the structural framework.

7. A system for determination of hydrocarbon accumulations in a subsurface geological area, the system comprising:

an input device configured to input data;

a properties module configured to create a structural framework using the data, wherein creating the structural framework comprises estimating one of initial fold axes, an axial plane, and a direction of heterogenous shear displacement resulting from a folding phase that includes a refolding phase;

a processor configured to calculate mechanical stress, to identify trapping mechanisms, to estimate a formation of the hydrocarbon accumulations, and to determine a location of the hydrocarbon accumulations; and a memory configured to store at least one of the structural framework and the data.

8. The system according to claim 7, wherein:

the data comprises at least one of a geological data and a geophysical data.

9. The system according to claim 7, wherein:

the mechanical stress includes compressional and tensional forces.

10. The system according to claim 7, wherein:

the processor is further configured to backstrip and to restore the data.

* * * * *